US009496001B2

(12) United States Patent
Kuroki

(10) Patent No.: US 9,496,001 B2
(45) Date of Patent: Nov. 15, 2016

(54) VIDEO PROCESSING APPARATUS AND METHOD OF CONTROLLING VIDEO PROCESSING APPARATUS

(71) Applicant: CANON KABUSHIKI KAISHA, Tokyo (JP)

(72) Inventor: Daisuke Kuroki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/514,241

(22) Filed: Oct. 14, 2014

(65) Prior Publication Data

US 2015/0110475 A1 Apr. 23, 2015

(30) Foreign Application Priority Data

Oct. 17, 2013 (JP) .................................. 2013-216479

(51) Int. Cl.
  *H04N 5/76* (2006.01)
  *G11B 27/00* (2006.01)
  *H04N 9/804* (2006.01)

(52) U.S. Cl.
  CPC ............... *G11B 27/005* (2013.01); *H04N 5/76* (2013.01); *H04N 9/8042* (2013.01)

(58) Field of Classification Search
  CPC .............................. G11B 27/005; H04N 5/76
  See application file for complete search history.

(56) References Cited

U.S. PATENT DOCUMENTS

| 2004/0036800 | A1* | 2/2004 | Ohki ...................... | H04N 19/30 348/459 |
| 2009/0103630 | A1* | 4/2009 | Fuchikami ............. | H04N 5/772 375/240.25 |
| 2009/0174810 | A1* | 7/2009 | Endo .................. | G02B 26/0833 348/390.1 |
| 2010/0166068 | A1* | 7/2010 | Perlman .................. | A63F 13/12 375/240.12 |
| 2014/0161198 | A1* | 6/2014 | Tan ...................... | H04N 19/895 375/240.27 |
| 2015/0110472 | A1  | 4/2015 | Matsuyama | |

FOREIGN PATENT DOCUMENTS

| JP | 2000-308016 A | 11/2000 |
| JP | 2010-171609 A | 8/2010 |

\* cited by examiner

*Primary Examiner* — Eileen Adams
(74) *Attorney, Agent, or Firm* — Canon USA, Inc. I.P. Division

(57) ABSTRACT

A frame memory of a video processing apparatus stores video frames that are respectively compressed based on compression parameters. A video output unit outputs video data based on the video frames stored in the frame memory so that the video data is displayed. A freeze frame determination unit of the video processing apparatus determines a video frame to be freeze displayed in response to an input of a freeze command for freezing the displayed video, based on the compression parameters of the video frames stored in the frame memory.

10 Claims, 4 Drawing Sheets

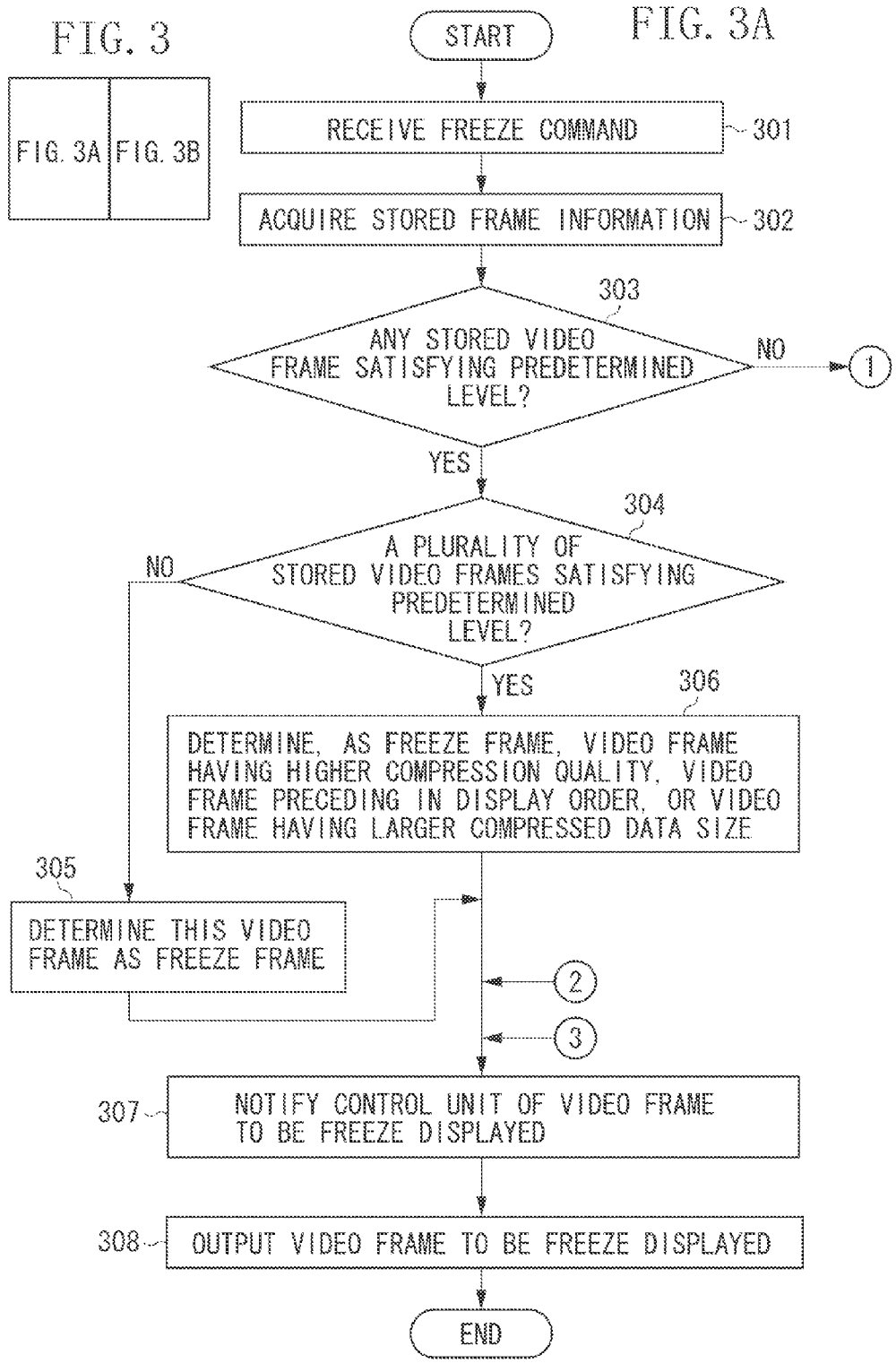

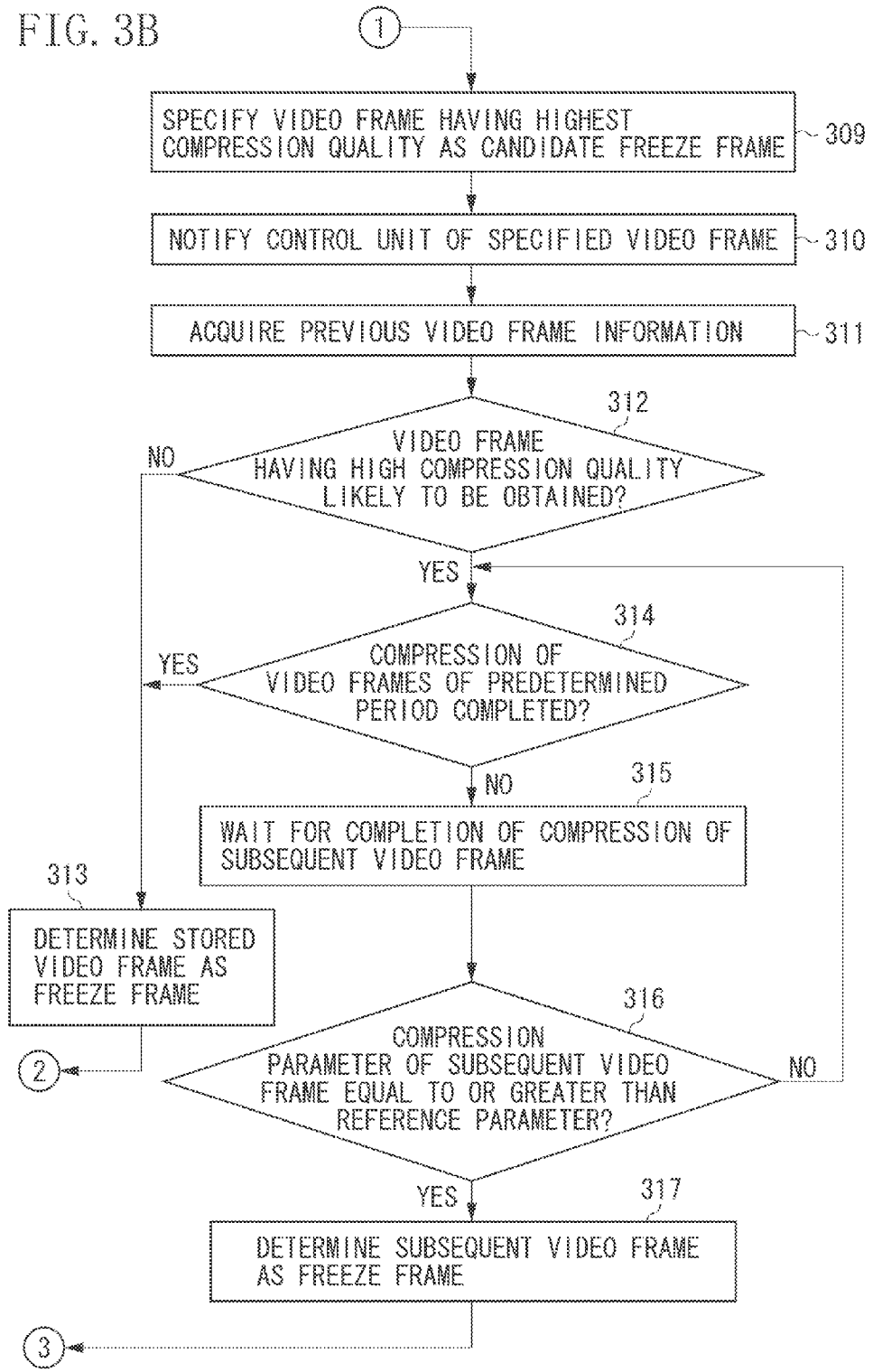

VIDEO PROCESSING APPARATUS AND METHOD OF CONTROLLING VIDEO PROCESSING APPARATUS

BACKGROUND OF THE INVENTION

1. Field of the Invention

The present invention relates to a technique for displaying high-quality freeze video.

2. Description of the Related Art

A video processing system such as a digital television applies various types of video processing such as interlace/progressive (IP) conversion, noise reduction, color adjustment, and resolution conversion to input video data and then outputs the resulting video data to a panel to display the video. In such a video processing system, a plurality of video processing units sequentially performs video processing while receiving and transmitting video data via a frame memory. Further, the video processing system stores video data corresponding to a plurality of frames for adjustment of the timing to input the video data and the timing to output the video data to the panel and also for the video processing units that refer to the video data of the plurality of frames.

Currently, the full high-definition (HD) resolution (1920× 1080) is a common resolution of digital televisions. However, standardization of higher-resolution video such as 4K2K (4096×2160) and ultra-high definition (7680×4320) has been developed, and there have been demands for video processing systems for displaying such video. Further, various types of new video processing have been discussed to further enhance image quality. In other words, the sizes of video data to be handled and the number of types of video processing to be performed on video data have been increasing. Thus, the amount of video data written to and read from a frame memory when sequential video processing is performed via the frame memory has dramatically been increasing.

In response to the foregoing situation, methods have been discussed that use a compression and decompression technique to reduce the amount of data written to and read from a frame memory.

Japanese Patent Application Laid-Open No. 2010-171609 discusses a video processing system in which input video data is compressed and then written to a frame memory and video data read from the frame memory is decompressed and then subjected to video processing.

Japanese Patent Application Laid-Open No. 2010-171609 also describes that the compression rate of video is increased if the video is to be displayed on a still screen or a high-definition television (TV), whereas the compression rate of the video is decreased to reduce the amount of power consumed by the apparatus to drive a battery.

Further, Japanese Patent Application Laid-Open No. 2000-308016 describes that when a freeze command (to select a still image mode) is input while video that is compressed according to the Moving Picture Experts Group (MPEG) standards is displayed, an intra-coded picture (I picture) is displayed among the I picture, a predictive coded picture (P picture), and a bipredictive coded picture (B picture).

In this case, however, a low-quality video frame may be freeze displayed in response to the freeze command.

For example, when the frame memory stores a plurality of video frames having different compression rates, if the freeze command is input to freeze display the video frame having the highest compression rate, low-quality video is freeze displayed.

Furthermore, for example, if the freeze command is input when the compression rates of the video frames stored in the frame memory are temporarily high due to occurrence of a scene change or the like, a low-quality video frame stored in the frame memory may be freeze displayed.

SUMMARY OF THE INVENTION

The present invention is directed to increasing the quality of video displayed in response to a freeze command.

According to an aspect of the present invention, an image processing apparatus for displaying video based on a video frame includes a storage control unit configured to store a compressed video frame in a memory, and a determination unit configured to determine, from a plurality of video frames stored in the memory, a video frame to be displayed during a pause of video in response to an input of a stop command to pause displaying the video, based on compression parameters of the plurality of video frames.

Further features of the present invention will become apparent from the following description of exemplary embodiments with reference to the attached drawings.

BRIEF DESCRIPTION OF THE DRAWINGS

FIGS. 3a and 3b are a flowchart illustrating processing executed by the video processing apparatus according to the exemplary embodiment.

DESCRIPTION OF THE EMBODIMENTS

Various exemplary embodiments, features, and aspects of the invention will be described in detail below with reference to the drawings.

Figure 1:
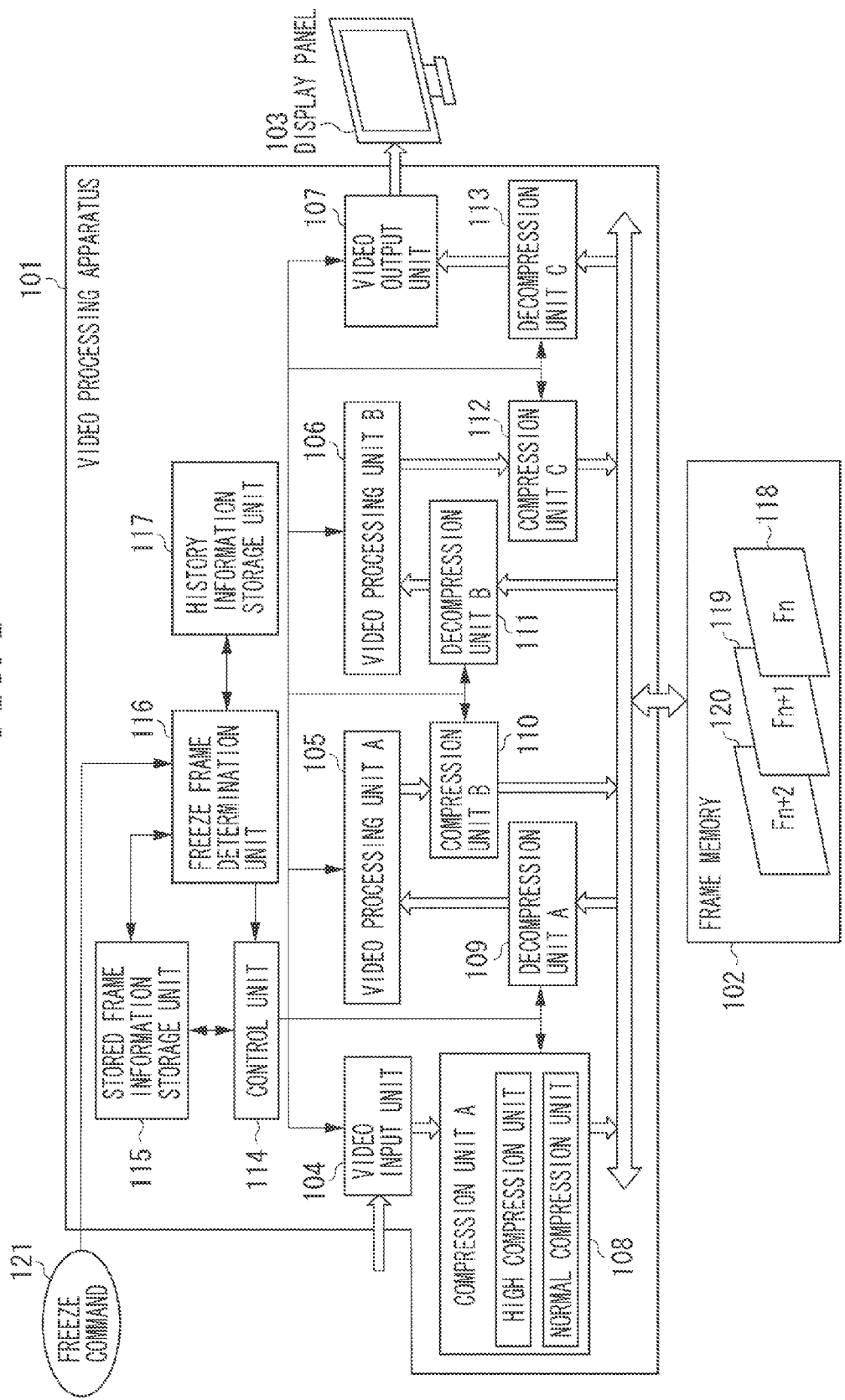
FIG. 1 is a configuration diagram illustrating a video processing apparatus according to an exemplary embodiment.

FIG. 1 is a block diagram illustrating functions of a video processing apparatus according to an exemplary embodiment of the present invention. A video processing apparatus 101 includes a frame memory 102, a video input unit 104, a video processing unit A 105, a video processing unit B 106, a video output unit 107, a compression unit A 108, a decompression unit A 109, a compression unit B 110, a decompression unit B 111, a compression unit C 112, and a decompression unit C 113. The video processing apparatus 101 further includes a control unit 114, a stored frame information storage unit 115, a freeze frame determination unit 116, and a history information storage unit 117. The video processing apparatus 101 according to the present exemplary embodiment is connected to a display panel 103. The video processing apparatus 101 and the display panel 103 may be a combined together as a single apparatus. The video processing apparatus 101 may be, for example, a large television, a laptop personal computer (laptop PC), a tablet PC, or a smartphone. Further, the video processing apparatus 101 may be a projection-type video processing apparatus such as a projector. The video processing apparatus 101 that is realized by a projector outputs video data to, for example, a screen instead of the display panel 103.

The video processing apparatus 101 receives baseband video data, sequentially executes video processing such as image quality enhancement processing via the frame memory 102 while compressing and decompressing the video data on a video frame-by-video frame basis, and outputs the processed video frame as video data to the display panel 103.

Since the timing of when the video data is input and the timing of when the video data is output are constant, the video processing apparatus 101 needs to execute predetermined video processing within a predetermined time. For example, if thirty video frames are input per second to the video processing apparatus 101, the video processing apparatus 101 outputs thirty processed video frames per second to the display panel 103. This is not the case, however, if the video processing includes frame rate increasing processing. If the video processing apparatus 101 executes the frame rate increasing processing, for example, the video processing apparatus 101 outputs sixty video frames per second to the display panel 103 in response to thirty video frames input per second.

While the present exemplary embodiment mainly describes the example in which the video processing is executed on a frame-by-frame basis, an exemplary embodiment of the present invention is also applicable to the case in which video frames are divided into a plurality of blocks to execute the video processing on a block-by-block basis.

The video processing apparatus 101 includes the compression and decompression units to reduce the amount of data read from or written to the frame memory 102.

When the video input unit 104 receives the baseband video data, the video input unit 104 transmits the video data to the compression unit A 108. The compression unit A 108 compresses each frame of the video data transmitted from the video input unit 104 and then writes the compressed video frames to the frame memory 102. The frame memory 102 of the video processing apparatus 101 according to the present exemplary embodiment is connected via a common bus to the compression unit A 108, the compression unit B 110, the compression unit C 112, the decompression unit A 109, the decompression unit B 111, and the decompression unit C 113.

The decompression unit A 109 reads from the frame memory 102 the compressed video frames written by the compression unit A 108, decompresses the video frames, and then transmits the decompressed video frames to the video processing unit A 105. The video processing unit A 105 executes video processing A such as image quality enhancement on the video frames received from the decompression unit A 109 and then transmits the processed video frames to the compression unit B 110.

The compression unit B 110 compresses the video frames transmitted from the video processing unit A 105 and then writes the compressed video frames to the frame memory 102. The decompression unit B 111 reads from the frame memory 102 the compressed video frames written by the compression unit B 110, decompresses the video frames, and then transmits the decompressed video frames to the video processing unit B 106. The video processing unit B 106 executes video processing B such as image quality enhancement on the video frames received from the decompression unit B 111 and then transmits the processed video frames to the compression unit C 112.

The compression unit C 112 compresses the video frames transmitted from the video processing unit B 106 and then writes the compressed video frames to the frame memory 102. The decompression unit C 113 reads from the frame memory 102 the compressed video frames written by the compression unit C 112, decompresses the video frames, and then transmits the decompressed video frames to the video output unit 107.

The video output unit 107 outputs the video frames as video data to the display panel 103 at the timing requested by the display panel 103. In this way, the video is displayed on the display panel 103.

The video processing unit A 105, the video processing unit B 106, and the video output unit 107 of the video processing apparatus 101 operate in parallel with one another. Accordingly, the compression unit A 108, the decompression unit A 109, the compression unit B 110, the decompression unit B 111, the compression unit C 112, and the decompression unit C 113 simultaneously access the frame memory 102. Depending on the type of the video processing, there may be a case in which the processing is started after one entire video frame is written to the frame memory 102 or a case in which the processing is started after a plurality of video frames is written to the frame memory 102. For example, if the video processing to be executed by the video processing unit A 105 is vertical flipping of video, after one video frame is written to the frame memory 102, the video processing unit A 105 reads the video frame from the end. Thus, when the video processing unit A 105 executes the video processing to vertically flip the video, the video processing unit A 105 executes the processing after one entire video frame is written to the frame memory 102.

Further, for example, there is video processing including super-resolution processing in which one high-resolution video frame is generated by referring to other video frames. If this video processing is to be executed by the video processing unit B 106, the video processing unit B 106 starts the processing after a plurality of video frames (for example, three video frames) is stored in the frame memory 102.

The video processing apparatus 101 according to the present exemplary embodiment stores three video frames 118, 119, and 120 in the frame memory 102 and is capable of executing the video processing to generate a high-resolution video frame using the three video frames as needed. In other words, the video processing apparatus 101 according to the present exemplary embodiment causes a temporal delay corresponding to at least the three video frames between the reception of video data by the video input unit 104 and the output of the video data by the video output unit 107. The video frame 119 is a video frame that is temporally subsequent to the video frame 118. The video frame 120 is a video frame that is temporally subsequent to the video frame 119. That is to say, the video frames 118, 119, and 120 are displayed in this order.

The frame memory 102 according to the present exemplary embodiment stores the video frame 118 compressed by the compression unit C 112, the video frame 119 compressed by the compression unit B 110, and the video frame 120 compressed by the compression unit A 108. In this case, if the video frame 120 is determined as a video frame to be freeze displayed, the video data of the video frame 120 is decompressed by the decompression unit A 109, undergoes video processing executed by the video processing unit A 105, is compressed by the compression unit B 110, and then stored in the frame memory 102. Then, the video data of the video frame 120 is decompressed by the decompression unit B 111, undergoes video processing executed by the video processing unit B 106, and is then output by the video output unit 107.

On the other hand, if the video frame 119 is determined as a video frame to be freeze displayed, the video data of the video frame 119 is decompressed by the decompression unit B 111, undergoes video processing executed by the video processing unit B 106, and is then output by the video output unit 107. Further, if the video frame 118 compressed by the compression unit C 112 is determined as a video frame to be freeze displayed, the video data of the video frame 118 is decompressed by the decompression unit C 113 and then output by the video output unit 107. Accordingly, the type and time of processing required to start a freeze display vary depending on the video frame to be freeze displayed among the video frames stored in the frame memory 102. Alternatively, three video frames compressed by the compression unit C 112 may be stored in the frame memory 102. In this case, the frame memory 102 needs to include a memory area that is large enough to store at least five video frames.

The compression and decompression units according to the present exemplary embodiment use as a compression/decompression technique the Joint Photographic Experts Group (JPEG) compression in which each video frame is compressed as a single still image. The compression method, however, is not limited to the JPEG. The degree of image quality degradation in the JPEG compression is determined by a parameter value of a quantization table used in the compression. The size of compressed data also varies depending on the parameter value of the quantization table that is used. For example, if a video frame is JPEG-compressed using the parameter value of the quantization table for high image quality, the degree of image quality degradation is small, but the size of compressed data is large, compared to the case of using the parameter value of the quantization table for low image quality. Further, when video frames are JPEG-compressed using the same parameter value of the quantization table, if the video frames have different frequency characteristics, the sizes of the resulting compressed data of the video frames differ.

In the present exemplary embodiment, changing the parameter value (compression parameter) of the quantization table to decrease image quality is referred to as decreasing the compression parameter (decreasing compression quality). Further, changing the parameter value (compression parameter) of the quantization table to increase image quality is referred to as increasing the compression parameter (increasing the compression quality). When a video frame is compressed, the amount of data of the compressed video frame is larger in the case where the video frame is compressed using a high compression parameter than the case where the video frame is compressed using a low compression parameter. Further, when a video frame is compressed, a difference in pixel value between the video frame before compression and the video frame after decompression is smaller in the case where the video frame is compressed using a high compression parameter than the case where the video frame is compressed using a low compression parameter. That is to say, the video frame is compressed at a lower compression rate in the case where the video frame is compressed using a high compression parameter than the case where the video frame is compressed using a low compression parameter. In the present exemplary embodiment, a video frame compressed using a compression parameter that is equal to or greater than a predetermined parameter (reference parameter) is referred to as a video frame having high compression quality. When a video frame is compressed using a compression parameter that is equal to or greater than the predetermined parameter, the video frame is compressed at a lower compression rate than the case where the video frame is compressed using a compression parameter that is smaller than the predetermined parameter.

As described above, the video processing apparatus 101 employs the compression/decompression technique to reduce the amount of data written to or read from the frame memory 102 to a predetermined amount or smaller and prevent a bandwidth overflow of the frame memory 102. To reduce the amount of data written to or read from the frame memory 102 to a predetermined amount or smaller, the control unit 114 monitors the compressed data size (size of data having been compressed) of each video frame to dynamically change the compression parameters of the compression unit A 108, the compression unit B 110, and the compression unit C 112.

If the compression quality is excessively decreased although the frame memory 102 has sufficient bandwidth, the displayed video is unnecessarily degraded. Thus, the control unit 114 dynamically changes the compression parameter of each of the compression units in such a way that the size of data (compressed data size) compressed by each of the compression units is within a target range of data size that is allocated to each of the compression units. In other words, the control unit 114 performs compression control on the compression units. To be responsive to change of a video processing mode by a user command or the like, the control unit 114 also controls the video input unit 104, the video processing unit A 105, the video processing unit B 106, the video output unit 107, the decompression unit A 109, the decompression unit B 111, and the decompression unit C 113.

The compression unit A 108 includes therein two compression units, a normal compression unit and a high compression unit. The normal compression unit compresses a video frame using a compression parameter controlled by the control unit 114. The high compression unit compresses a video frame using a compression parameter of the lowest quality. The two compression units can operate simultaneously and write data of the compressed video frame to the frame memory 102. Similarly to the compression unit A 108, each of the compression unit B 110 and the compression unit C 112 also includes the normal compression unit and the high compression unit therein. Alternatively, only the compression unit A 108 may be configured to include the high compression unit.

If input video data is suddenly changed to complicated video due to a scene change or the like, the high compression unit compresses the video frames using a compression parameter of the lowest quality and then writes the compressed video frames to the frame memory 102. The reason therefor is as follow. When the video is suddenly changed due to occurrence of a scene change or the like, if the video is compressed using the compression parameter controlled by the control unit 114, the data size of the compressed video frame may exceed the target data size. Thus, the high compression unit detects occurrence of a significant change in video such as a scene change to compress the video frame using a compression parameter of the lowest quality.

After the high compression unit compresses the video frame, the control unit 114 sets the compression parameter to be used by the normal compression unit in such a way that the set compression parameter is higher by a predetermined value than the compression parameter of the lowest quality, and then the control unit 114 causes the normal compression unit to compress the subsequent video frame. Then, the control unit 114 gradually changes the compression parameter to increase the compression quality of each video frame in such a way that the data size of each compressed video frame does not exceed the target data size.

More specifically, if a difference between first and second video frames that are consecutive in display order is a first difference, the normal compression unit of the compression unit A 108 compresses the second video frame. On the other hand, if the difference between the first and second video frames is a second difference that is larger than the first difference, the high compression unit of the compression unit A 108 compresses the second video frame. In this way, the compression unit A 108 compresses the second video frame at a higher compression rate in the case where the difference between the first and second video frames is the second difference than the case where the difference is the first difference.

As illustrated in FIG. 1, a freeze command 121 can be input to the video processing apparatus 101 according to the present exemplary embodiment. The freeze command is a command for freezing a displayed video. In response to the freeze command, one of the video frames constituting a moving image continues to be displayed until a freeze cancellation command is input. The freeze command includes a command for pausing and capturing the moving image being displayed. While the present exemplary embodiment mainly describes the example in which the freeze command is input by a user operation, the idea of the exemplary embodiment of the present invention is also applicable to a use case in which, for example, the freeze command is automatically input in a specific scene.

According to the present exemplary embodiment, if, for example, the user performs an operation to stop the screen or the like while a moving image is displayed, the freeze command 121 is transmitted to the video processing apparatus 101.

If a video frame to be freeze displayed is uniformly determined according to the timing of input of the freeze command 121, a video frame of low quality (low image quality) may be freeze displayed depending on the timing of input of the freeze command 121. Thus, the video processing apparatus 101 according to the present exemplary embodiment performs control in such a way that a video frame of the highest possible quality is freeze displayed.

As illustrated in FIG. 1, the video processing apparatus 101 according to the present exemplary embodiment includes the stored frame information storage unit 115, the freeze frame determination unit 116, and the history information storage unit 117.

The stored frame information storage unit 115 is a module for storing information including the compression quality (compression parameter) and compressed data size (data size of compressed video frame) of each video frame stored in the frame memory 102. The compression parameter according to the present exemplary embodiment corresponds to the parameter value of the quantization table. The information stored in the stored frame information storage unit 115 is updated by the control unit 114 as necessary.

Since the frame memory 102 according to the present exemplary embodiment stores three video frames, the stored frame information storage unit 115 stores information about the stored frame (Fn) 118, the stored frame (Fn+1) 119, and the stored frame (Fn+2) 120.

In the present exemplary embodiment, the compression unit A 108, the compression unit B 110, and the compression unit C 112 use the same compression parameter to compress a video frame. More specifically, the compression unit A 108, the compression unit B 110, and the compression unit C 112 commonly use a first compression parameter to compress the video frame 118 and a second compression parameter to compress the video frame 119. Thus, the stored frame information storage unit 115 according to the present exemplary embodiment stores the compression parameters each being associated with a different one of the three video frames stored in the frame memory 102. Alternatively, a single video frame may be compressed using different compression parameters depending on the compression unit. In this case, the stored frame information storage unit 115 stores a plurality of compression parameters associated with a single video frame. Then, the freeze frame storage unit 116 refers to, as the compression parameter for the single video frame, the compression parameter corresponding to the highest compression rate among the plurality of compression parameters associated with the single video frame.

When the freeze frame determination unit 116 receives the freeze command 121 input by a user operation, the freeze frame determination unit 116 refers to the information stored in the stored frame information storage unit 115 to determine whether each of the compression parameters of the three video frames satisfies a predetermined level. If any of the compression parameters of the three video frames satisfies the predetermined level, the freeze frame determination unit 116 determines a video frame to be freeze displayed from the video frame(s) that satisfies the predetermined level. Then, the freeze frame determination unit 116 notifies the control unit 114 of identification information to be used to identify the video frame to be freeze displayed. While the present exemplary embodiment mainly describes the example in which three video frames are stored in the frame memory 102, the number of video frames stored in the frame memory 102 is not limited to three.

If none of the compression parameters of the three video frames satisfies the predetermined level, the freeze frame determination unit 116 specifies a video frame with the highest compression parameter among the video frames stored in the frame memory 102. Then, the freeze frame determination unit 116 refers to the history information storage unit 117. The history information storage unit 117 stores information about the compression quality (compression parameter) and compressed data size (data size of compressed video frame) of most recent video frames corresponding to a predetermined period (e.g., three video frames).

Thus, the stored frame information storage unit 115 is a module configured to store information about the video frames that are currently stored in the frame memory 102 by the video processing apparatus 101. The history information storage unit 117 is a module configured to store information about video frames that were stored in the past in the frame memory 102 by the video processing apparatus 101.

The freeze frame determination unit 116 uses the information stored in the history information storage unit 117 to determine whether there is a high possibility that a video frame having high compression quality can be obtained within the next predetermined period (e.g., within five video frames). If the freeze frame determination unit 116 determines that there is a low possibility that a video frame having high compression quality can be obtained, the freeze frame determination unit 116 determines, as the video frame to be freeze displayed, the video frame specified as the candidate video frame to be freeze displayed, and then the freeze frame determination unit 116 notifies the control unit 114 of the identification information about the determined video frame.

On the other hand, if the freeze frame determination unit 116 determines that there is a high possibility that a video frame having high compression quality can be obtained, the freeze frame determination unit 116 monitors the compression parameters of the video frames input within the predetermined period after the input of the freeze command. Then, if the freeze frame determination unit 116 finds, within the predetermined period after the candidate video frame to be freeze displayed has been specified, a video frame of which the compression parameter satisfies the predetermined level, the freeze frame determination unit 116 determines the found video frame as the video frame to be freeze displayed. On the other hand, if the freeze frame determination unit 116 does not find, within the predetermined period after the candidate video frame to be freeze displayed has been specified, any video frame of which the compression parameter satisfies the predetermined level, the freeze frame determination unit 116 determines the candidate video frame as the video frame to be freeze displayed.

Alternatively, the freeze frame determination unit 116 may determine, as the video frame to be freeze displayed, a video frame having the best compression quality among the video frames that are input within the predetermined period after the candidate video frame to be freeze displayed has been specified.

The freeze frame determination unit 116 according to the present exemplary embodiment determines whether there is a high possibility that a video frame having high compression quality can be obtained within a predetermined period based on how the compression quality of video frames input in the past changed. Details of a method for the determination will be described below. If the freeze frame determination unit 116 determines that there is a high possibility that a video frame having high compression quality can be obtained within the predetermined period, the freeze frame determination unit 116 monitors the compression quality of newly-input video frames corresponding to the predetermined period.

The freeze frame determination unit 116 includes therein a counter and has a maximum value of the number of video frames that continue to undergo video processing. The freeze frame determination unit 116 counts up each time the video processing on one video frame is completed after the input of the freeze command. If the count value reaches a threshold value (the maximum value of the number of video frames that continue to undergo video processing) while no video frame having compression quality that satisfies the predetermined level appears, the freeze frame determination unit 116 stops executing the video processing on a new video frame. Then, the freeze frame determination unit 116 determines, as the video frame to be freeze displayed, the video frame specified as the candidate video frame to be freeze displayed, and the freeze frame determination unit 116 notifies the control unit 114 of the determined video frame.

The maximum value of the number of video frames that continue to undergo video processing varies depending on the video processing apparatus 101. Further, the maximum number of the video frames that continue to undergo video processing may be determined by a user operation or an operation mode. If the maximum value of the number of video frames that continue to undergo video processing is set to a small value, for example, the freeze display can promptly be realized in response to the freeze command. On the other hand, if the maximum value of the number of video frames that continue to undergo video processing is set to a high value, a video frame of higher quality is more likely to be freeze displayed in response to the freeze command.

The control unit 114 continues the normal control of video processing even when the freeze frame determination unit 116 receives the freeze command 121. If the control unit 114 receives a notification about the freeze display from the freeze frame determination unit 116, the control unit 114 performs control to freeze display the video frame corresponding to the identification information contained in the notification.

Figure 2:
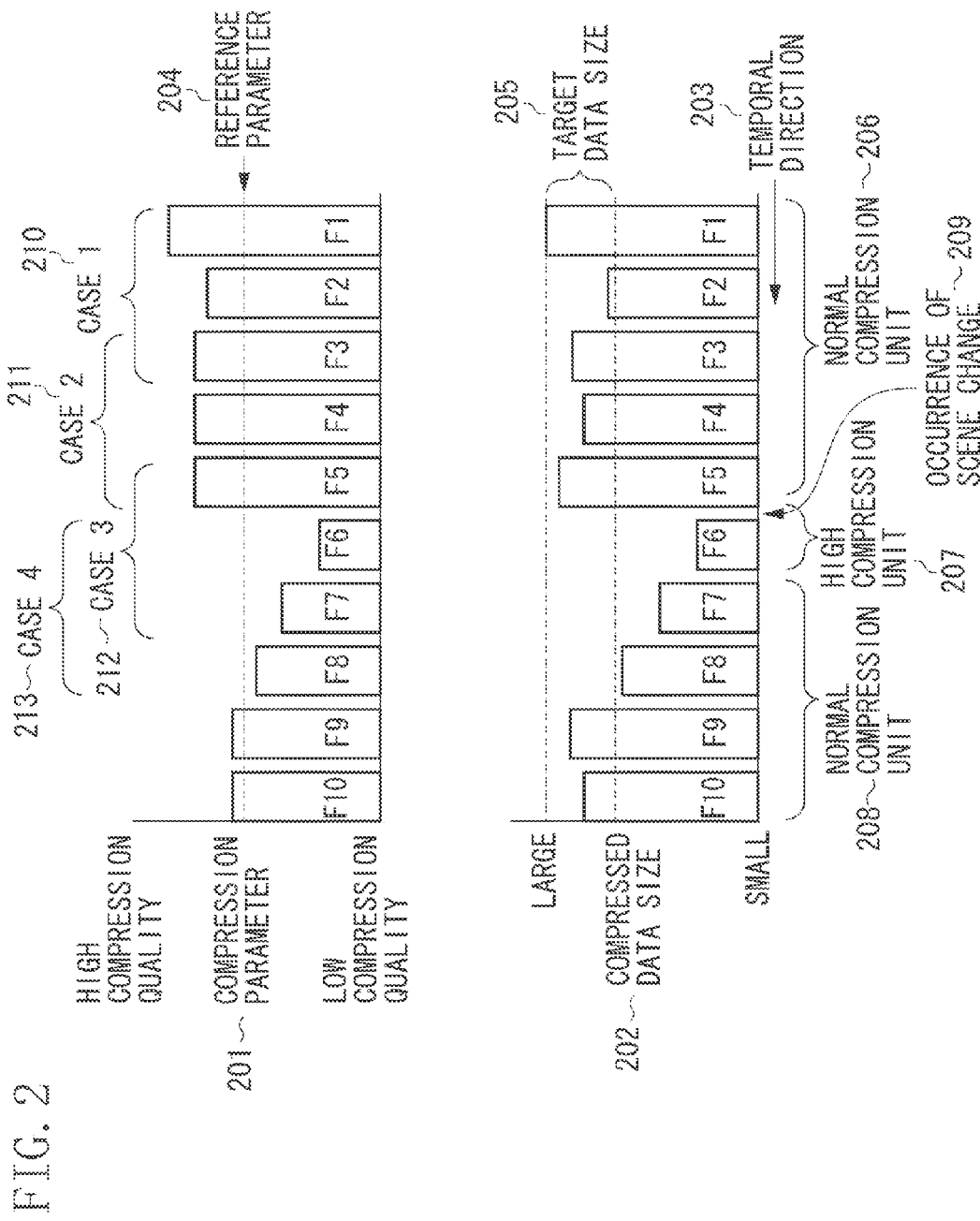
FIG. 2 illustrates a compression parameter and data size of each video frame according to the exemplary embodiment.

A method used by the freeze frame determination unit 116 to determine the video frame to be freeze displayed will be described in more detail with reference to FIG. 2. FIG. 2 illustrates changes in the compression parameter and the compressed data size among the video frames that are obtained when the compression unit A 108 compresses video data from the video input unit 104 under the control of the control unit 114 and are then written to the frame memory 102.

FIG. 2 illustrates a compression parameter 201. In the present exemplary embodiment, when a video frame is compressed, the amount of data of the compressed video frame is larger in the case where the video frame is compressed using a high compression parameter than the case where the video frame is compressed using a low compression parameter. Further, when a video frame is compressed, a difference in pixel value between the video frame before compression and the video frame after decompression is smaller in the case where the video frame is compressed using a high compression parameter than the case where the video frame is compressed using a low compression parameter. A video frame having high compression quality according to the present exemplary embodiment is a video frame compressed using a compression parameter that is equal to or greater than a predetermined parameter (reference parameter).

The upper part of FIG. 2 illustrates the compression parameter 201 of each of ten video frames (video frames F1 to F10). FIG. 2 indicates that a vertically-longer video frame has been compressed using a higher compression parameter. For example, the video frame F1 is compressed using a higher compression parameter than the video frame F2. According to the present exemplary embodiment, the video frame F1 is determined as a video frame having higher compression quality than the video frame F2.

FIG. 2 also illustrates a reference parameter 204. The freeze frame determination unit 116 according to the present exemplary embodiment determines a video frame compressed using a compression parameter higher than the reference parameter 204 as a video frame that satisfies the predetermined level.

The horizontal axis of FIG. 2 is a temporal axis. The temporal direction is from the right to the left. Specifically, the video frames F1, F2, F3, . . . , and F10 denote different video frames, and the compression unit A 108 compresses the video frames F1, F2, F3, . . . , and F10 in this order.

The lower part of FIG. 2 illustrates a compressed data size 202 (data size of each compressed video frame). FIG. 2 indicates that a vertically-longer video frame has a larger compressed data size.

FIG. 2 also illustrates a target data size 205. As illustrated in FIG. 2, the target data size 205 according to the present exemplary embodiment has a certain range. The control unit 114 according to the present exemplary embodiment controls the compression parameter 201 used by the compression unit A 108 in such a way that the data size of each compressed video frame is within the range of the target data size 205.

For example, when the data size of the compressed video frame F6 is smaller than the target data size 205 as illustrated in FIG. 2, the control unit 114 controls the compression parameter 201 used to compress the video frame F7 so that the video frame F7 has higher compression quality. On the other hand, when, for example, the data size of the compressed video frame F1 is larger than the target data size 205, the control unit 114 controls the compression parameter 201 used to compress the video frame F2 so that the video frame F2 has lower compression quality. The video frames F1 to F10 in the upper part of FIG. 2 are respectively the same video frames as the video frames F1 to F10 in the lower part of FIG. 2. As illustrated in FIG. 2, although video frames (e.g., the video frames F3 and F4) are compressed using the same compression parameter 201, the compressed data size 202 varies depending on the video frame.

Each of the video frames F1 to F5 is compressed by the normal compression unit of the compression unit A 108. Then, a scene change occurs at the timing indicated by a scene change 209 so that the video suddenly becomes complicated at the video frame F6. The compression unit A 108 detects that the video suddenly becomes complicated at the video frame F6, and then the compression unit A 108 switches the compression unit to the high compression unit so that the video frame F6 is compressed by the high compression unit. The high compression unit compresses the video frame F6 using the compression parameter 201 of the lowest quality. Then, the compression unit A 108 switches the compression unit to the normal compression unit so that the video frame F7 and the subsequent video frames are compressed by the normal compression unit. The normal compression unit compresses each of the video frames while gradually increasing the compression parameter 201 under the control of the control unit 114.

The video processing apparatus 101 according to the present exemplary embodiment performs the foregoing control to avoid the situation in which the data size of a compressed video frame significantly exceeds the target data size due to an occurrence of a scene change or the like.

The following describes processing performed by the video processing apparatus 101 when the freeze command is input in the situation illustrated in FIG. 2. As used herein, the freeze command refers to a command for freezing displayed video. In response to the freeze command, one of the video frames constituting the moving image continues to be displayed until a freeze cancellation command is input. The freeze command includes a command for pausing and capturing the moving image being displayed. While the present exemplary embodiment mainly describes the example in which the freeze command is input by a user operation, the idea of the exemplary embodiment of the present invention is also applicable to a use case in which, for example, the freeze command is automatically input in a specific scene.

A case 1 (210) illustrates an example in which the freeze command is input at the timing of when the video frames F1, F2, and F3 are stored in the frame memory 102. The freeze frame determination unit 116 refers to the stored frame information storage unit 115 to acquire information (compression parameter and compressed data size) about each of the video frames F1 to F3. Each of the video frames F1 to F3 is compressed using the compression parameter 201 equal to or greater than the reference parameter 204. Thus, the freeze frame determination unit 116 determines the video frame F1, which has the largest compressed data size among the video frames F1 to F3, as the video frame to be freeze displayed. Then, the freeze frame determination unit 116 notifies the control unit 114 of the identification information about the video frame F1 and a freeze display command. When the control unit 114 receives the notification from the freeze frame determination unit 116, the control unit 114 performs the control in such a way that the video output unit 107 continues to output the video frame F1.

As the foregoing describes, if a plurality of video frames of which the compression parameters satisfy the predetermined level are stored in the frame memory 102, the freeze frame determination unit 116 according to the present exemplary embodiment determines, as the video frame to be freeze displayed, the video frame having the largest compressed data size. The reason therefor is that a compressed video frame having a larger data size is more likely to contain a larger amount of information. Alternatively, the freeze frame determination unit 116 may determine, as the video frame to be freeze displayed, the video frame that is earlier in display order among the plurality of video frames of which the compression parameters satisfy the predetermined level. In this way, a video frame closer to the timing of the input of the freeze command can be freeze displayed.

A case 2 (211) illustrates an example in which the freeze command is input at the timing of when the video frames F3, F4, and F5 are stored in the frame memory 102. The freeze frame determination unit 116 refers to the stored frame information storage unit 115 to acquire information (compression parameter and compressed data size) about each of the video frames F3 to F5. Each of the video frames F3 to F5 is compressed using the compression parameter 201 equal to or greater than the reference parameter 204. Thus, the freeze frame determination unit 116 determines the video frame F5, which has the largest compressed data size among the video frames F3 to F5, as the video frame to be freeze displayed. Then, the freeze frame determination unit 116 notifies the control unit 114 of the identification information about the video frame F5 and a freeze display command. When the control unit 114 receives the notification from the freeze frame determination unit 116, the control unit 114 performs control in such a way that the video output unit 107 continues to output the video frame F5.

A case 3 (212) illustrates an example in which the freeze command is input at the timing when the video frames F5, F6, and F7 are stored in the frame memory 102. The freeze frame determination unit 116 refers to the stored frame information storage unit 115 to acquire information (compression parameter and compressed data size) about each of the video frames F5 to F7. Among the video frames F5 to F7, only the video frame F5 is compressed using the compression parameter 201 equal to or greater than the reference parameter 204. Thus, the freeze frame determination unit 116 determines the video frame F5 as the video frame to be freeze displayed. Then, the freeze frame determination unit 116 notifies the control unit 114 of the identification information about the video frame F5 and a freeze display command. When the control unit 114 receives the notification from the freeze frame determination unit 116, the control unit 114 performs control in such a way that the video output unit 107 continues to output the video frame F5.

A case 4 (213) illustrates an example in which the freeze command is input at the timing when the video frames F6, F7, and F8 are stored in the frame memory 102. The freeze frame determination unit 116 refers to the stored frame information storage unit 115 to acquire information (compression parameter and compressed data size) about each of the video frames F6 to F8. Each of the video frames F6 to F8 is compressed using the compression parameter 201 smaller than the reference parameter 204. Thus, the freeze frame determination unit 116 specifies the video frame F8 having the highest compression quality among the video frames F6 to F8 as the candidate video frame to be freeze displayed, and the freeze frame determination unit 116 notifies the control unit 114 of the candidate video frame F8. The control unit 114 performs control not to delete the data of the video frame F8 from the frame memory 102.

After the freeze frame determination unit 116 specifies the candidate video frame to be freeze displayed, the freeze frame determination unit 116 refers to the history information storage unit 117 to acquire information (compression parameter and compressed data size) about three video frames F3 to F5, which precede the video frame F6 in display order. Based on the information about the compression parameters of the video frames F3 to F8, the freeze frame determination unit 116 determines whether a video frame having high compression quality (video frame compressed using the compression parameter 201 equal to or greater than the reference parameter 204) is likely to be obtained within the next predetermined period.

The changes in the compression parameter 201 among the video frames F3 to F8 indicate that a scene change or the like occurs at the video frame F6 to cause a significant drop in compression quality and thereafter the compression quality increases at the video frames F7 and F8. That is to say, the compression parameter of each of the video frames F3 to F5 before the scene change is equal to or greater than the reference parameter 204, and the compression parameter 201 of the video frame F8 is higher than the compression parameter 201 of the video frame F7. In such a case, the freeze frame determination unit 116 determines that a video frame having high compression quality is likely to be obtained within the next predetermined period.

If the freeze frame determination unit 116 determines that a video frame having high compression quality is likely to be obtained within the next predetermined period, the freeze frame determination unit 116 notifies the control unit 114 of the identification information about the candidate video frame to be freeze displayed but does not notify the control unit 114 of a freeze display command. Thus, the moving image continues to be displayed even after the freeze command is input. Then, at the timing of when the video frame F9 compressed using the compression parameter 201 that is equal to or greater than the reference parameter 204 is stored in the frame memory 102, the freeze frame determination unit 116 determines the video frame F9 as the video frame to be freeze displayed. The freeze frame determination unit 116 notifies the control unit 114 of the identification information used to identify the video frame F9 and a freeze display command.

The freeze frame determination unit 116 according to the present exemplary embodiment operates as follows if the freeze frame determination unit 116 determines that the compression parameters 201 of the video frames stored in the frame memory 102 at the timing of when the freeze command is input are smaller than the reference parameter 204. Specifically, the freeze frame determination unit 116 determines whether a video frame having high compression quality (video frame compressed using the compression parameter 201 equal to or greater than the reference parameter 204) is likely to be obtained within the next predetermined period. If the freeze frame determination unit 116 determines that a video frame having high compression quality is likely to be obtained within the next predetermined period, the freeze frame determination unit 116 causes the display of the moving image to continue, and if a video frame having high compression quality is input, the freeze frame determination unit 116 determines the input video frame as the video frame to be freeze displayed.

While the freeze frame determination unit 116 according to the present exemplary embodiment refers to values of compression parameters of six video frames F3 to F8 to determine whether a video frame having high compression quality is likely to be obtained within the next predetermined period, the exemplary embodiment is not limited to this example. For example, the freeze frame determination unit 116 may determine whether a video frame having high compression quality is likely to be obtained within the next predetermined period by referring to the compression parameters of the video frames F6 to F8 without referring to the values of the video frames F3 to F5. In this way, the history information storage unit 117 becomes unnecessary. Further, the determination described above may be executed using the compressed data size.

Further, while the present exemplary embodiment first specifies the candidate video frame to be freeze displayed and then determines whether a video frame having high compression quality is likely to be obtained within the next predetermined period, the order of the specification and the determination may be reversed.

An operation performed by the video processing apparatus 101 according to the present exemplary embodiment will be described below with reference to the flowchart illustrated in FIG. 3. A central processing unit (CPU) of the video processing apparatus 101 executes a program to implement the processing illustrated in FIG. 3. The video processing apparatus 101 may be, for example, a large television, a laptop PC, a tablet PC, or a smartphone. Further, the video processing apparatus 101 may be a projection-type video processing apparatus such as a projector. The video processing apparatus 101 that is realized by a projector outputs video data to, for example, a screen instead of the display panel 103.

The processing illustrated in FIG. 3 is started if the video processing apparatus 101 receives a freeze command while outputting a moving image. While displaying a moving image, the video processing apparatus 101 is outputting video via the video output unit 107 at the frame rate of video data received by the video input unit 104. Further, while displaying a moving image, the video processing apparatus 101 compresses video data input to the video input unit 104 by use of a compression parameter and then stores the compressed video data as video frames in the frame memory 102 (storage control step). Further, while displaying a moving image, the video processing apparatus 101 decompresses the video frames read from the frame memory 102 and executes various types of video processing on the decompressed video frames. The video processing includes, but not limited to, noise reduction, frame rate conversion, image quality enhancement processing, and the like. If the frame rate conversion is performed, the frame rate of video data input to the video processing apparatus 101 differs from the frame rate of the video data output from the video processing apparatus 101. The compression and decompression are executed by the compression units A to C and the decompression units A to C under the control of the control unit 114. The video processing is executed by the video processing units A and B under the control of the control unit 114.

In step S301, the freeze frame determination unit 116 inputs a freeze command. In the present exemplary embodiment, the freeze command is a command for stopping video being displayed as a moving image. In response to the freeze command, one of the video frames constituting the moving image continues to be displayed until a freeze cancellation command is input. The freeze command includes a command for pausing and capturing the moving image being displayed. While the present exemplary embodiment mainly describes the example in which the freeze command is input by a user operation, the idea of the exemplary embodiment of the present invention is also applicable to a use case in which, for example, the freeze command is automatically input in a specific scene. If the freeze frame determination unit 116 finishes inputting the freeze command, the processing proceeds to step S302.

In step S302, the freeze frame determination unit 116 acquires information (compression parameter and compressed data size) about the video frames from the stored frame information storage unit 115. Specifically, in step S302, the freeze frame determination unit 116 acquires information about each of the three video frames stored in the frame memory 102. If the freeze frame determination unit 116 acquires the information about the video frames, the processing proceeds to step S303.

In step S303, the freeze frame determination unit 116 refers to the information acquired in step S302 and determines whether the frame memory 102 stores a video frame having compression quality satisfying a predetermined level. More specifically, the freeze frame determination unit 116 determines whether the frame memory 102 stores a video frame compressed using the compression parameter 201 equal to or greater than the reference parameter 204. If the freeze frame determination unit 116 determines that the frame memory 102 stores a video frame having compression quality satisfying the predetermined level (YES in step S303), the processing proceeds to step S304. On the other hand, if the freeze frame determination unit 116 determines that the frame memory 102 does not store a video frame having compression quality satisfying the predetermined level (NO in step S303), the processing proceeds to step S309.

In step S304, the freeze frame determination unit 116 determines whether the frame memory 102 stores a plurality of video frames having compression quality satisfying the predetermined level. If the freeze frame determination unit 116 determines that the frame memory 102 stores a plurality of video frames having compression quality satisfying the predetermined level (YES in step S304), the processing proceeds to step S306. On the other hand, if the freeze frame determination unit 116 determines that the frame memory 102 does not store a plurality of video frames having compression quality satisfying the predetermined level (NO in step S304), the processing proceeds to step S305.

In step S306 (determination step), the freeze frame determination unit 116 determines the video frame to be freeze displayed among the video frames having compression quality satisfying the predetermined level.

More specifically, the freeze frame determination unit 116 determines, as the video frame to be freeze displayed, the video frame having higher compression quality (video frame compressed using a higher compression parameter) among the video frames having compression quality satisfying the predetermined level. In other words, the freeze frame determination unit 116 determines the video frame to be freeze displayed in response to the input freeze command, based on the respective compression parameters of the plurality of video frames stored in the frame memory 102.

When first and second video frames each of which is compressed using a compression parameter that satisfies the predetermined level are stored in the frame memory 102, the freeze frame determination unit 116 determines the first video frame as the video frame to be freeze displayed. The first video frame is a video frame corresponding to a compression parameter for higher compression quality (lower compression rate) than the second video frame. In this way, the possibility that a video frame having higher image quality is freeze displayed increases.

The method for the determination of the video frame in step S306 is not limited to the foregoing method. Examples of the method include a method in which among a plurality of video frames having compression quality that satisfies the predetermined level, the video frame that is earlier in display order is determined as the video frame to be freeze displayed. Specifically, when first and second video frames each of which is compressed using a compression parameter that satisfies the predetermined level are stored in the frame memory 102, the freeze frame determination unit 116 determines the first video frame as the video frame to be freeze displayed because the first video frame is earlier in display order. In this way, a video frame that better corresponds to the timing of the input of the freeze command is freeze displayed.

Another method for the determination of the video frame in step S306 is a determination method that is based on the compressed data size (data size of a compressed video frame). Specifically, when first and second video frames each of which is compressed using a compression parameter that satisfies the predetermined level are stored in the frame memory 102, the freeze frame determination unit 116 determines the first video frame as the video frame to be freeze displayed because the data size of the first video frame having been compressed is larger than that of the second video frame. In this way, a video frame containing a larger amount of information is more likely to be freeze displayed.

In step S305, since there is only one video frame satisfying the predetermined level, the freeze frame determination unit 116 determines the video frame as the video frame to be freeze displayed. Once the freeze frame determination unit 116 determines the video frame in step S305 or S306, the processing proceeds to step S307.

In step S307, the freeze frame determination unit 116 notifies the control unit 114 of a freeze display command and the identification information to be used to identify the video frame determined as a freeze frame. In step S308 (output step), the control unit 114 controls the video output unit 107 in such a way that the video frame corresponding to the identification information acquired from the freeze frame determination unit 116 continues to be output until a freeze cancellation command is input.

In step S309, the freeze frame determination unit 116 specifies, as the candidate video frame to be freeze displayed, the video frame having the best compression quality among the video frames stored in the frame memory 102. In step S310, the freeze frame determination unit 116 notifies the control unit 114 of the specified video frame. The control unit 114 performs control in such a way that the video frame corresponding to the identification information acquired from the freeze frame determination unit 116 is not deleted from the frame memory 102.

In step S311, the freeze frame determination unit 116 acquires information (compression parameter and compressed data size) about previous video frames stored in the history information storage unit 117. In the present exemplary embodiment, the freeze frame determination unit 116 acquires information about three video frames displayed before the video frames stored in the frame memory 102.

In step S312, the freeze frame determination unit 116 determines whether a video frame having high compression quality is likely to be obtained within the next predetermined period, by use of the information acquired from the history information storage unit 117. If each of the compression parameters of the previous three video frames is equal to or greater than the reference parameter and if the compression parameter of the video frame that is earlier in display order in the frame memory 102 is smaller than the compression parameter of the video frame that is later in display order, the freeze frame determination unit 116 determines that a video frame having high compression quality is likely to be obtained within the next predetermined period.

On the other hand, if the compression parameter of any of the previous three video frames is smaller than the reference parameter, the freeze frame determination unit 116 determines that a video frame having high compression quality is not likely to be obtained within the next predetermined period. Further, if the compression parameter of the video frame that is earlier in display order in the frame memory 102 is greater than the compression parameter of the video frame that is later in display order, the freeze frame determination unit 116 determines that a video frame having high compression quality is not likely to be obtained within the next predetermined period.

In other words, if the freeze frame determination unit 116 determines that the frame memory 102 does not store a video frame compressed by a compression parameter that satisfies the predetermined level, then in step S312, the freeze frame determination unit 116 executes the following determination. Specifically, the freeze frame determination unit 116 determines whether, among the first and second video frames stored in the frame memory 102 at the time of the input of the freeze command, the first video frame, which precedes the second video frame in display order, corresponds to the compression parameter for a higher compression rate than the second video frame.

If the freeze frame determination unit 116 determines that the first video frame corresponds to the compression parameter for a higher compression rate than the second video frame, the freeze frame determination unit 116 determines, as the video frame to be freeze displayed, a third video frame stored after the input of the freeze command.

On the other hand, if the freeze frame determination unit 116 determines that the first video frame corresponds to the compression parameter for a lower compression rate than the second video frame, the freeze frame determination unit 116 determines the first video frame as the video frame to be freeze displayed at the time when the freeze command is input.

If the freeze frame determination unit 116 determines that a video frame having high compression quality is likely to be obtained within the next predetermined period (YES in step S312), the processing proceeds to step S314. On the other hand, if the freeze frame determination unit 116 determines that a video frame having high compression quality is not likely to be obtained within the next predetermined period (NO in step S312), the processing proceeds to step S313.

In step S314, the freeze frame determination unit 116 determines whether the compression of the video frames of the predetermined period has been completed. In the present exemplary embodiment, the video frames of the predetermined period are two video frames. The length of the predetermined period, however, is not limited to this example. If the freeze frame determination unit 116 determines that the compression of the video frames of the predetermined period has been completed (YES in step S314), the processing proceeds to step S313. On the other hand, if the freeze frame determination unit 116 determines that the compression of the video frames of the predetermined period has not been completed (NO in step S314), the processing proceeds to step S315.

In step S315, the freeze frame determination unit 116 waits for the completion of the compression of the subsequent video frame. If the compression of the subsequent video frame is completed, then in step S316, the freeze frame determination unit 116 determines whether the compression parameter of the subsequent video frame is equal to or greater than the reference parameter. If the freeze frame determination unit 116 determines that the compression parameter of the subsequent video frame is equal to or greater than the reference parameter (YES in step S316), then in step S317, the freeze frame determination unit 116 determines the video frame as the video frame to be freeze displayed.

If the frame memory 102 does not store a video frame compressed using a compression parameter that satisfies the predetermined level, then in step S317, the freeze frame determination unit 116 determines the following video frame as the video frame to be freeze displayed. Specifically, the freeze frame determination unit 116 determines, as the video frame to be freeze displayed, the video frame that is stored after the input of the freeze command and is compressed using a compression parameter that satisfies the predetermined level.

In step S316, if the freeze frame determination unit 116 determines that the compression parameter is smaller than the reference parameter (NO in step S316), the processing returns to step S314. If no video frame compressed using a compression parameter that is equal to or greater than the reference parameter appears within the predetermined period, the freeze frame determination unit 116 determines, as the video frame to be freeze displayed, the video frame specified as the candidate video frame to be freeze displayed in step S309.

As the foregoing describes, if the video processing apparatus 101 according to the present exemplary embodiment receives a freeze command while outputting video frames for displaying a moving image, the video processing apparatus 101 determines a video frame to be freeze displayed based on the compression parameter. More specifically, the freeze frame determination unit 116 of the video processing apparatus 101 determines, as the video frame to be freeze displayed, the video frame that is already stored in the frame memory 102 at the time of the reception of the freeze command and is compressed using a compression parameter that is equal to or greater than the reference parameter.

While the foregoing describes that if no video frame compressed using a compression parameter that is equal to or greater than the reference parameter is stored at the time of the reception of the freeze command by the video processing apparatus 101, the video processing apparatus 101 determines whether a video frame having predetermined compression quality is likely to be obtained within the next predetermined period, the exemplary embodiment is not limited to this example. Alternatively, the freeze frame determination unit 116 may determine, as the video frame to be freeze displayed, the video frame having higher compression quality among the video frames stored in the frame memory 102 at the time of the reception of the freeze command.

In this way, the quality of the freeze frame can be increased compared to the case where the video frame to be freeze displayed is determined based only on the timing of the freeze command. Furthermore, since the foregoing configuration does not require the determination of whether a video frame having high compression quality is likely to be obtained within the next predetermined period, the processing load can be reduced.

Further, while the present exemplary embodiment mainly describes the example in which the freeze frame is determined after the input of the freeze command, the exemplary embodiment is not limited to this example. Alternatively, the control unit 114 may determine a freeze frame before the freeze command is input, based on the compression mode of each video frame stored in the frame memory 102.

Further, the video processing apparatus 101 may continue to store a non-freeze frame in the frame memory 102 among the video frames stored in the frame memory 102 at the time of the input of the freeze command until the freeze cancellation is commanded. Then, for example, the control unit 114 may display the last video frame input before the freeze frame during the freeze display. That is to say, if a video frame desired by the user is not determined as the freeze frame, the user can change the freeze frame.

The exemplary embodiment of the present invention can increase the quality of a video to be displayed in response to a freeze command.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-216479 filed Oct. 17, 2013, which is hereby incorporated by reference herein in its entirety.

What is claimed is:

1. An image processing apparatus for displaying video, the image processing apparatus comprising:
   a compressor configured to compress a video frame constituting the video;
   a memory configured to store the compressed video frame; and
   a determination unit configured to determine, from among a plurality of video frames corresponding to the compressed video frames compressed by the compressor and stored in the memory, based on a compression ratio of each of the plurality of compressed video frames stored in the memory, a pause video frame to be displayed during a pause of the video in response to an input of a stop command to pause displaying the video so that a first video frame is determined as the pause video frame to be displayed during the pause of the video in a case where a compressed first video frame and a compressed second video frame are stored in the memory and a compression ratio of the compressed second video frame is higher than a compression ratio of the compressed first video frame;
   a decompression unit configured to decompress the compressed video frame corresponding to the determined video frame to obtain a display video frame; and
   a display unit configured to display the decompressed video frame during the pause of the video.

2. The image processing apparatus according to claim 1, wherein if the stop command is input when a third video frame and a fourth video frame are stored in the memory and if the compression ratio of each of the third video frame and the fourth video frame satisfies a predetermined level, the determination unit determines the third video frame preceding the fourth video frame in display order as the pause video frame to be displayed during the pause.

3. The image processing apparatus according to claim 1, wherein if the stop command is input when the third video frame and the fourth video frame are stored in the memory and if the compression ratio of each of the third video frame and the fourth video frame satisfies a predetermined level, the determination unit determines the third video frame having a larger amount of data than the fourth video frame as the pause frame to be displayed during the pause.

4. The image processing apparatus according to claim 1, wherein when the stop command is input, if the memory does not store a video frame corresponding to a compression ratio satisfying a predetermined level, the determination unit determines, as the pause video frame to be displayed during the pause, a video frame input to the image processing apparatus after the input of the stop command.

5. The image processing apparatus according to claim 1, wherein when the stop command is input, if the memory stores the first video frame and the second video frame each corresponding to a compression parameter that does not satisfy a predetermined level and if the compression parameter of the first video frame corresponds to a compression parameter that leads to a compression rate higher than that of the second video frame, the determination unit determines, as the pause video frame to be displayed during the pause, a video frame input to the image processing apparatus after the input of the stop command, and
   wherein when the stop command is input, if the memory stores the first video frame and the second video frame each corresponding to a compression parameter that does not satisfy the predetermined level and if the compression parameter of the first video frame corresponds to a compression parameter that leads to a compression rate lower than that of the second video frame, the determination unit determines the first video frame as the pause video frame to be displayed during the pause.

6. The image processing apparatus according to claim 1, further comprising a compression control unit configured to control the compression parameters of a plurality of video frames so that when a difference between the first video frame and the second video frame to be displayed following the first video frame is a first difference, a compression rate of the second video frame is higher than when the difference is a second difference which is greater than the first difference.

7. A method of controlling an image processing apparatus for displaying video, the method comprising:
   compressing a video frame constituting the video;
   storing the compressed video frame in a memory;
   determining, from among a plurality of video frames corresponding to the compressed video frames and stored in the memory, based on a compression ratio of each of the plurality of compressed video frames stored in the memory, a pause video frame to be displayed during a pause of the video in response to an input of a stop command to pause displaying the video so that a first video frame is determined as the pause video frame to be displayed during the pause of the video in a case where a compressed first video frame and a compressed second video frame are stored in the memory and a compression ratio of the compressed second video frame is higher than a compression ratio of the compressed first video frame;

decompressing the compressed video frame corresponding to the determined video frame to obtain a display video frame; and displaying the decompressed video frame during the pause of the video.

8. The method according to claim 7, wherein if the stop command is input when a third video frame and a fourth video frame are stored in the memory and if the compression ratio of each of the third video frame and the fourth video frame satisfies a predetermined level, the determining determines the third video frame preceding the fourth video frame in display order as the pause video frame to be displayed during the pause.

9. A storage medium storing a program for causing a computer to execute a method of controlling an image processing apparatus for displaying video, the method comprising:

compressing a video frame constituting the video;

storing the compressed video frame in a memory;

determining, from among a plurality of video frames corresponding to the compressed video frames and stored in the memory, based on a compression ratio of each of the plurality of compressed video frames stored in the memory, a pause video frame to be displayed during a pause of the video in response to an input of a stop command to pause displaying the video so that a first video frame is determined as the pause video frame to be displayed during the pause of the video in a case where a compressed first video frame and a compressed second video frame are stored in the memory and a compression ratio of the compressed second video frame is higher than a compression ratio of the compressed first video frame;

decompressing the compressed video frame corresponding to the determined video frame to obtain a display video frame; and displaying the decompressed video frame during the pause of the video.

10. The storage medium according to claim 9, wherein if the stop command is input when a third video frame and a fourth video frame are stored in the memory and if the compression ratio of each of the third video frame and the fourth video frame satisfies a predetermined level, the determining determines the third video frame preceding the fourth video frame in display order as the pause video frame to be displayed during the pause.

* * * * *